(12) United States Patent
Pathapati et al.

(10) Patent No.: US 11,642,609 B2
(45) Date of Patent: May 9, 2023

(54) METHOD FOR SEPARATION WITH SIMULATED MOVING BED

(71) Applicant: ProPharma Group Europe B.V., Leiden (NL)

(72) Inventors: Trinath Pathapati, Leiden (NL); Pieter Johannes Den Boer, Schipholweg (NL); Dennis Nicholas Rütze, Leiden (NL)

(73) Assignee: ProPharma Group Europe B.V., Leiden (NL)

( * ) Notice: Subject to any disclaimer, the term of this patent is extended or adjusted under 35 U.S.C. 154(b) by 291 days.

(21) Appl. No.: 17/048,918

(22) PCT Filed: Dec. 31, 2018

(86) PCT No.: PCT/EP2018/086906
§ 371 (c)(1),
(2) Date: Oct. 19, 2020

(87) PCT Pub. No.: WO2019/201465
PCT Pub. Date: Oct. 24, 2019

(65) Prior Publication Data
US 2021/0252424 A1    Aug. 19, 2021

(30) Foreign Application Priority Data
Apr. 20, 2018   (EP) .................................. 18168553

(51) Int. Cl.
*B01D 15/18*   (2006.01)

(52) U.S. Cl.
CPC ..... *B01D 15/1828* (2013.01); *B01D 15/1807* (2013.01); *B01D 15/1842* (2013.01); *B01D 15/1871* (2013.01); *B01D 15/1885* (2013.01); *B01D 2215/023* (2013.01)

(58) Field of Classification Search
CPC ............ B01D 15/1828; B01D 15/1807; B01D 15/1842; B01D 15/1871; B01D 15/1885; B01D 2215/023
See application file for complete search history.

(56) References Cited

U.S. PATENT DOCUMENTS

| 2004/0129137 A1 | 7/2004 | Chin et al. |
| 2013/0116495 A1 | 5/2013 | Frey et al. |

FOREIGN PATENT DOCUMENTS

| CN | 101116805 A | 2/2008 |
| EP | 1994972 A1 | 11/2008 |
| JP | 2000079301 A | 3/2000 |

OTHER PUBLICATIONS

International Search Report and Written Opinion in International Patent Application No. PCT/EP2018/086906 dated Mar. 27, 2019, 12 pages.

*Primary Examiner* — Benjamin L Lebron
(74) *Attorney, Agent, or Firm* — Smith Baluch LLP (57) ABSTRACT

The present invention relates to a method for separating one or more components from a liquid feed mixture in an EBA-SMB operating mode without the need of pumps at the outlets of the EBA columns. The present invention also relates to a simulated moving bed separation device with expanded bed adsorption columns which can be used in the method according to the invention.

8 Claims, 3 Drawing Sheets

METHOD FOR SEPARATION WITH SIMULATED MOVING BED

CROSS-REFERENCE TO RELATED APPLICATIONS

This application in a national-phase application, under 35 U.S.C. § 371, of International Application No. PCT/EP2018/086906, filed on Dec. 31, 2018, which in turn claims priority to European Patent Application No. 18168553.8, filed on Apr. 20, 2018. Each of these applications is incorporated herein by reference in its entirety.

FIELD OF THE INVENTION

The present invention relates to a method for the separation of at least one component from a mixture in a simulated moving bed device using expanded bed adsorption columns. The present invention also relates to a simulated moving bed separation device with expanded bed adsorption columns.

BACKGROUND OF THE INVENTION

Simulated moving bed (SMB) devices have been described in a review article by Chin et al (2004) (Chin C. Y. and Wang N-H. L. (2004) "Simulated Moving Bed Equipment Designs", in "Separation and Purification Reviews", Volume 33, pp. 77-155).

The use of expanded bed columns in the separation of a component from a mixture has been under extensive investigation, which strongly focused on adsorption/capture purification of biological macromolecules like proteins, peptides, nucleic acids and virus particles. Some of the major motivations for implementing EBA (expanded bed adsorption) include (1) reduction of pre-treatment steps in case of cell-culture based streams and streams with some suspended solids, as the turbid, viscous streams can flow through the EBA columns without clogging and at the same time enabling the capture of target molecules, and (2) low or negligible back pressure in EBA columns enable high flow rates which results in high productivity.

The principles and methods of EBA has been described in detail by Amersham Biosciences in "Expanded Bed Adsorption—Principles and Methods" (ISBN 18-1124-26) and by Frej et al. (2018) (K. A.-K. Frej and R. A. Hjorth (2018) "Expanded Bed Adsorption" in Biopharmaceutical Processing, Chapter 13, pages 269-277 (ISBN: 978-0-08-100623-8)).

The advantages of operating at high flowrates due to EBA mode has been described in several patents from Upfront, including WO98/08603 which discloses purification of immunoglobulins (a special class of proteins), WO00/57982 which discloses purification of biomacromolecules (DNA, RNA, bacteria, virus) and WO2004/082397 describing purification of biomolecules at high flow rate and high temperature.

The separation of useful components from a mixture in a SMB device using expanded bed columns has been described in patent document EP1994972. In particular, this document relates to the isolation of components, such as proteins, from crude agro and dairy sources, in particular from potato juice.

SUMMARY OF THE INVENTION

According to the present invention, the control of a separation process using a SMB device with expanded bed columns has been simplified considerably. In particular, a process may be operated, wherein the presence of only inlet pumps is sufficient for stabile EBA operation in SMB mode.

In the EBA-SMB systems described thus far, extensive control units both at the inlet and the outlet of each column were needed for proper control of the bed height in the columns, for example multiple components including movable adapters, valves and pumps formed the outlet control units. Surprisingly, it was found that the system could be operated reliably with a reduction of the components forming the control units. In particular, it was found that the system could be operated without a pump and without a movable adapter at the outlet ends of the columns, and that a stable fluidized bed column could still be maintained throughout the separation process.

DETAILED EMBODIMENTS OF THE INVENTION

According to a particular embodiment, the present invention can be described as a method for separating at least one component from a liquid feed mixture, like a cell suspension containing suspended solids, in a simulated moving bed separation device ("device") wherein the separation results in a product outlet stream, and wherein the separation device comprises:
 a plurality of separation units with inlet and outlet control units through which a liquid flow of the mixture can be established in each separation unit in an upward flow, resulting for each unit into an input stream and an output stream; wherein each of the separation units comprises an expanded bed of a separation matrix;
 wherein an upward flow can be maintained through the plurality of separation units during a plurality of steps; and
 wherein each of the separation units can be involved in one of a feeding step, a washing step, an elution step, a cleaning step, an equilibration step or a compensation step;
 a plurality of inflow control units, each comprising at least one pump and/or at least one valve, which are communicatively coupled to each of said plurality of separation units;
 a plurality of outflow control units, each consisting of at least one valve, which are communicatively coupled to each of said plurality of separation units;
 wherein the control units establish the liquid flow through said plurality of separation units, and
 wherein the expanded bed of the separation matrix in each of the separation units is maintained at a predetermined level.

According to a further particular embodiment the present invention relates to a method for the separation of at least one component from a liquid feed mixture in a simulated moving bed separation device,
 wherein the separation device comprises a plurality of separation units each with a fixed inlet and a fixed outlet through which during operation of the simulated moving bed separation device a liquid flow can be established in each separation unit in an upward direction, resulting for each separation unit into an input stream and an output stream;
 wherein each of the plurality of separation units comprises an expanded bed of a separation matrix;
 wherein in each of the separation units the space above the separation matrix bed is completely filled with liquid without a gas void above the separation matrix bed;

wherein each of said plurality of separation units is communicatively coupled to at least one inflow control unit and to at least one outflow control unit;

wherein each inflow control unit comprises at least one pump and at least one valve;

wherein each outflow control unit comprises at least one valve without a pump.

wherein the liquid feed mixture is fed to the inlet of each separation unit in sequence;

wherein each of the separation units is subsequently subjected to one of a washing step, an elution step, a cleaning step, an equilibration step or a compensation step; and wherein a purified product outlet stream containing the at least one component is collected.

In a further aspect, the present invention provides for a simulated moving bed separation device, wherein the separation device comprises a plurality of separation units each with a fixed inlet and a fixed outlet through which during operation of the simulated moving bed separation device a liquid flow can be established in each separation unit in an upward direction, resulting for each separation unit into an input stream and an output stream;

wherein each of the plurality of separation units comprises an expanded bed of a separation matrix;

wherein in each of the separation units the space above the separation matrix bed is completely filled with liquid without a gas void above the separation matrix bed;

wherein each of said plurality of separation units is communicatively coupled to at least one inflow control unit and to at least one outflow control unit;

wherein each inflow control unit comprises at least one pump and at least one valve;

wherein each outflow control unit comprises at least one valve without a pump;

Instead of the term "device" also the term "system" or the term "apparatus" may be applied.

EP2139573 teaches that for the regulation of the flow rate through EBA columns two pumps are needed: one upstream of the inlet of the column and one downstream of the outlet of the column.

A critical reason for implementation of an outlet pump for EBA column is to maintain the liquid level head on top of expanded bed as explained in the U.S. Pat. No. 9,220,997B2 by Upfront. The patent describes that the outlet pump is controlled depending on the position of a movable top adaptor compared to expanded bed surface and liquid level above it. In addition, the outlet pump can maintain a constant column pressure. This principle has been further implemented in case of an EBA-SMB concept described in EP1994972B1 by Avebe U. A., wherein EBA columns were designed with a movable top adaptor. However, a simple third generation EBA batch system set-up with only inlet pump has been described by Jin (2015) (Z. Jin (2015) "Expanded bed adsorption—challenges and advances in column and process design" Pharmaceutical Engineering January/February 2015, 1-12). This set-up simplifies the system design.

A "separation unit" according to the present invention can be any chromatographic unit, and in particular an expanded bed adsorption unit.

A separation unit may comprise one column or may comprise a plurality of columns. Where a separation unit comprises two or more columns, these columns may be operated either in series or in parallel.

According to the present invention, each of the separation units is completely filled with liquid without a void at the top of the separation unit. In particular each of the columns of the separation units is completely filled with liquid without a void containing air or any other gas at the top thereof.

According to the present invention, the EBA design involves a fixed outlet. This means that at each separation unit (or at each column, if a separation unit comprises more than one column) a movable top adaptor is absent, and the outlet flow rate can be controlled by the inlet pump. According to the present invention, each separation unit (or each column, if a separation unit comprises more than one column) has a fixed inlet. This means that also at the inlet of the separation device (or column) no movable (bottom) adapter is present. Therefore, the EBA-SMB system and automation design is simplified without requiring additional pumps at every outlet.

Rather, in the method according to the present invention the bed level of the separation matrix can be controlled by monitoring the distance between the top of the separation matrix bed and the top of the separation unit (or column) and modifying the liquid flow rate in the separation unit by adjusting the speed of the inlet pump when the distance deviates from a preset value. A person skilled in the art will be able to provide such level control without undue experimentation.

The separation process described in EP1994972B1 relates to a plurality of EBA columns, which are each coupled to inflow and outflow control units. These control units each consist of a pump as well as a valve in order to control the flow of liquid through the respective columns. In addition, the outflow control unit also contains a movable adapter.

Disadvantages of the use of a movable adapter at the top of a column will be the risk of fouling and contamination of the space above the movable adapter and the complexity of the design and of the control of the separation method.

It was found according to the present invention that the separation process could also be performed reliably when the pumps and movable adapter at the outlet of each of the EBA columns were absent.

A "liquid feed mixture" as used herein means a liquid medium containing one or more components to be separated. This "liquid feed mixture" either may contain only dissolved components or may contain particulate material next to the components to be separated. A liquid feed mixture containing particulate material may for example be a biological broth, such as a fermentation broth derived from microbial or mammalian cells or a complex biological stream including a plant extract, an extract derived from first, second and third generation biofuel feedstocks, or a biological stream from a pharmaceutical, biochemical, food processing or dairy industry with viscosity or turbidity or density higher than water.

Components which can be separated from a liquid feed mixture according to the present invention may be for example small molecular weight components, such as amino acids, sugars, carboxylic acids, organic acids, esters, amides, amines, nitriles, nitro-compounds, phenols, ethers, aldehydes, ketones, alcohols, lipids, hydrocarbons, halides, steroids, alkaloids, small peptides.

Commercially produced peptides cover such as dipeptides and tripeptides. These include peptides derived from dairy hydrolysates from cow, goat, sheep, buffalo and camels and comprise cyclic dipeptides, peptides derived from casein, peptides derived from whey, hydrolyzed casein, hydrolyzed whey. The commercially produced organic acids can include acetic acid, lactic acid, citric acid, itaconic acid, succinic acid and propionic acid. Commercially produced sugars include monosaccharides and disaccharides, such as xylose, glucose, fructose and sucrose. These sugars can also originate from various feed stocks such as beets, sugarcane, potatoes, grasses, wood or other hemi cellulosic feed stocks. Commercially produced alcohols include butanol, ethanol, propanol, butanediol and propanediol. Besides this, the technology also applies to high value compounds defined under small molecule terminology according to pharmacology. Examples of these items are precursors for antibiotics, alkaloids obtained from plants glycosides, polyketides and steroids.

Components which can be separated from a liquid feed mixture according to the present invention may also be for example macromolecular molecules, such as biomacromolecules, exemplified by polypeptides, proteins, polynucleotides, such as DNA and RNA, polysaccharides.

Components which can be separated from a liquid feed mixture according to the present invention may also be viral particles such as viruses or viral components.

According to the present invention "separation of at least one component from a liquid feed mixture" may involve separating one component from the feed mixture or may involve fractionating two or more components from the feed mixture.

A "simulated moving bed separation device" according to the present invention comprises a plurality of elementary adsorption or fractionating zones operating in series and in a closed loop, each of said zones comprising, between two successive sequential injection points for feed or eluent or diluted feed or regenerate or wash liquid, or for the sequential extraction of extract or raffinate, an adsorbent, and a circulating volume in the loop which is empty of adsorbent. Simulated moving bed is further abbreviated herein as SMB.

Accordingly, the separation of the at least one component could be established by feeding to each separation unit in sequence the liquid feed mixture and follow this feeding step by a washing step, an elution step, a cleaning step, and optionally an equilibration step. In between any of these steps a compensation step could be introduced in order to compensate for variable zone duration due to bed level control with respect to changing process conditions. The compensation zones help in maintaining a constant cycle time when operating in a loop, maintaining a cyclic steady state.

By way of example we illustrate the process steps in the description below. In alternative modes of carrying out the process of the invention also one or more additional steps may be included, or one or more steps may be deleted.

During the feeding step the conditions in the EBA column are suitable for binding of the component or components to be separated in the separation unit. In particular, the conditions in the separation matrix are suitable for binding of the component or components to be separated in the separation unit.

In the washing step any contaminants from the liquid feed mixture can be removed from the separation unit.

The component or components to be separated can be eluted from the separation unit in the elution step wherein conditions are applied which resolve the binding of the particular component to the separation matrix in the separation unit.

In a subsequent cleaning step, contaminants remaining in the separation unit can be removed, whereas in the equilibration step the separation unit is prepared to receive the next load of the liquid feed mixture.

In the context of the present invention with "separation matrix" is meant a solid particulate material linked with functional groups, which can reversibly bind with the components to be separated in the process of the invention. The particulate material can be made of organic or inorganic compounds. Suitable inorganic materials are for example ceramic, silica and glass beads. Preferred inorganic materials are silica. Suitable organic materials are for example agarose, cellulose, dextran, styrene or acrylic monomers using divinyl benzene as cross-linking agent. Preferred organic materials are agarose and styrene divinyl benzene based matrices. The matrix may also involve a combination of organic and inorganic materials like for example agarose based matrix with tungsten carbide based core. The matrix can be porous, non porous or gel type.

The lower limit of the average particle diameter of the particulate material constituting the separation matrix can preferably be 300 µm, more preferably 150 µm, more preferably 50 µm going to as low as 10 µm. The upper limit of the average particle diameter can be 800 µm, more preferably 600 µm, more preferably 300 µm. The average particle diameter ranges preferably between 50 and 800 µm, more preferably between 20 and 400 µm and even more preferably between 50 and 300 µm. The particle size distribution can either be a non-homogenous distribution of different particle sizes in the same column with <90% of similar sized adsorbent beads or a homogenous distribution, preferably >90% of similar particle size in the column, more preferably >95%, more preferably 100% similar particle size. Similar particle size herein means preferably maximum of +/−20% deviation from average particle size, more preferably maximum of +/−10% deviation from average particle size, more preferably +/−1% deviation from average particle size. The average particle density or specific gravity is required to be higher than that of the feed stream and can vary between 1.01 to 4.0 g/ml, preferably between 1.05-2 g/ml.

The term "expanded bed" in the context of the present invention means that the adsorbent beads are in suspended state by introducing an upward flow of liquid stream which results in an increase in the liquid void volume between the particles by 1.1 to 4-fold, preferably between 1.1 to 2.5-fold, more preferably between 1.1 to 2-fold.

The functional groups linked to the above particulate material may be cationic or anionic groups, or mixed cationic and anionic groups, or hydrophobic groups, or groups with affinity towards a specific entity to be separated or purified, or mixed cationic and hydrophobic groups, or mixed anionic and hydrophobic groups, or mixed affinity and ion exchange groups, or mixed affinity and hydrophobic groups, or any functional or non-functional group which can lead to a chromatography based separation.

The functional groups may be permanently or reversibly linked to the particulate material. Preferably, the functional groups are permanently linked through a covalent bond, or semi-permanently linked through electrostatic or hydrophobic or vanderwaals interactions or a combination of multiple types of linkages.

The person skilled in the art will be able to select the proper separation matrix for isolating and or purifying the desired component or components from a particular liquid feed mixture.

In a particular embodiment of the invention the SMB device comprises a plurality of in-flow detectors which can provide an output signal corresponding to the detection of a chemical or physical parameter within the device.

An "in-flow detector" according to the present invention is in embodiments a detector, which can monitor a chemical or physical parameter in the liquid stream in the separation device.

The "chemical or physical parameter" according to the present invention may for example be pH, conductivity, light absorbance, electromagnetic waves, ultrasound and/or the level of the separation matrix in a separation unit.

Figure 1:
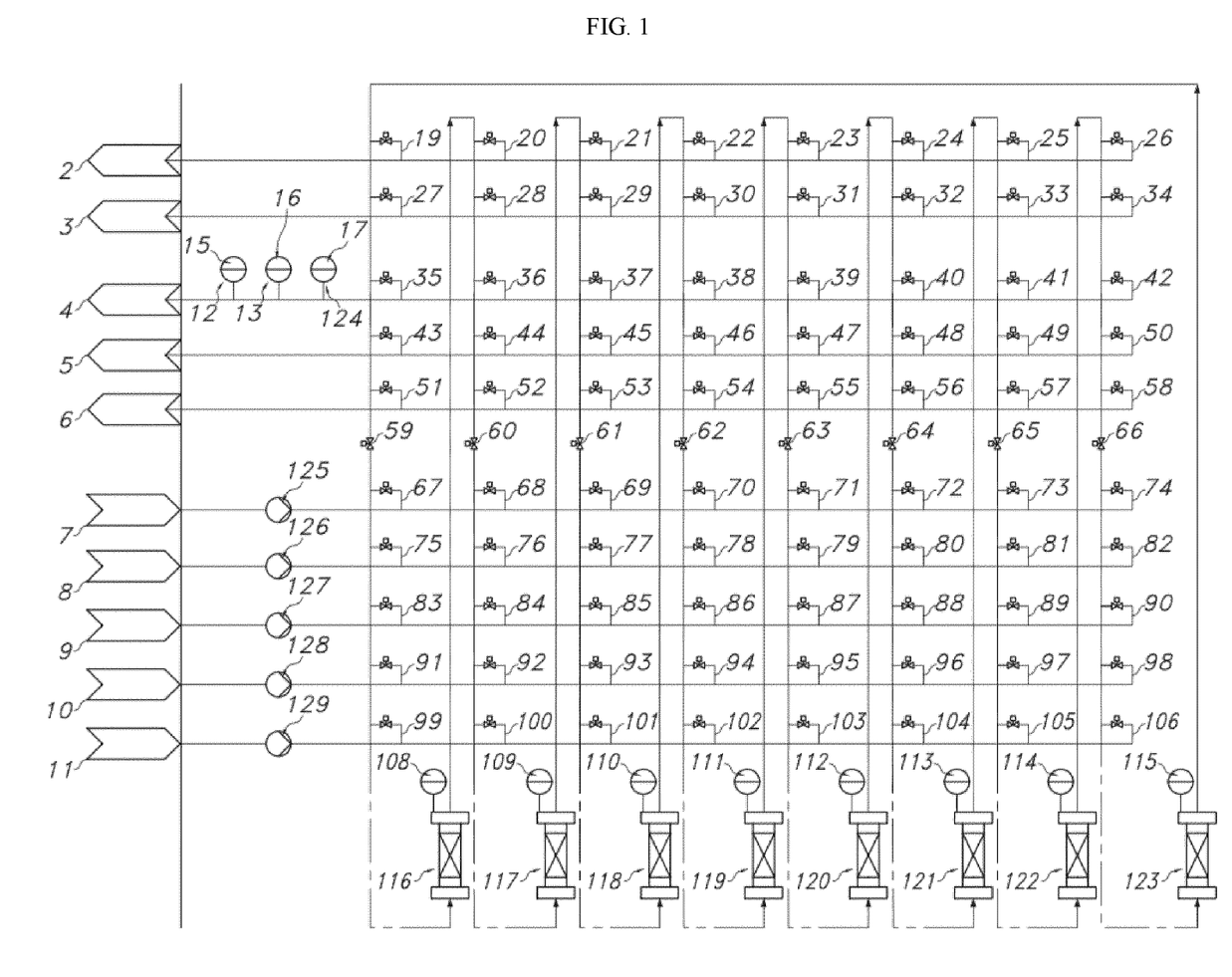
FIG. 1: EBA-SMB setup is further explained in EXAMPLE 1. The meaning of the numbering in FIG. 1 is given in the following table.

In the separation device exemplified in FIG. 1, eight columns (item numbers 116-123) are present which can be operationally linked into for example 6 separation units, by means of the input valves with item numbers 67-106 as well as by means of the valves with item numbers 59-66, which can be used to arrange within a separation unit certain columns in series. By using the input ports (item numbers 7-11) the respective feed streams (such as the liquid feed mixture and the feed streams for the steps such as washing, elution and regeneration) can be transported by the pumps (125-129) to the separation units. Through the output ports (item numbers 2-6), the product stream(s) (containing the component(s) to be separated as well as the waste streams from the steps (such as washing, elution and regeneration) can leave the separation device, by means of the output valves with item numbers 19-58. The bed levels in each of the columns are monitored by the level sensors (item numbers 108-115). Furthermore, the separation system comprises sensors for pH (item number 15), conductivity (item number 16) and absorbance (item number 17) in the stream flowing through output port 3 (item number 4).

Figure 2:
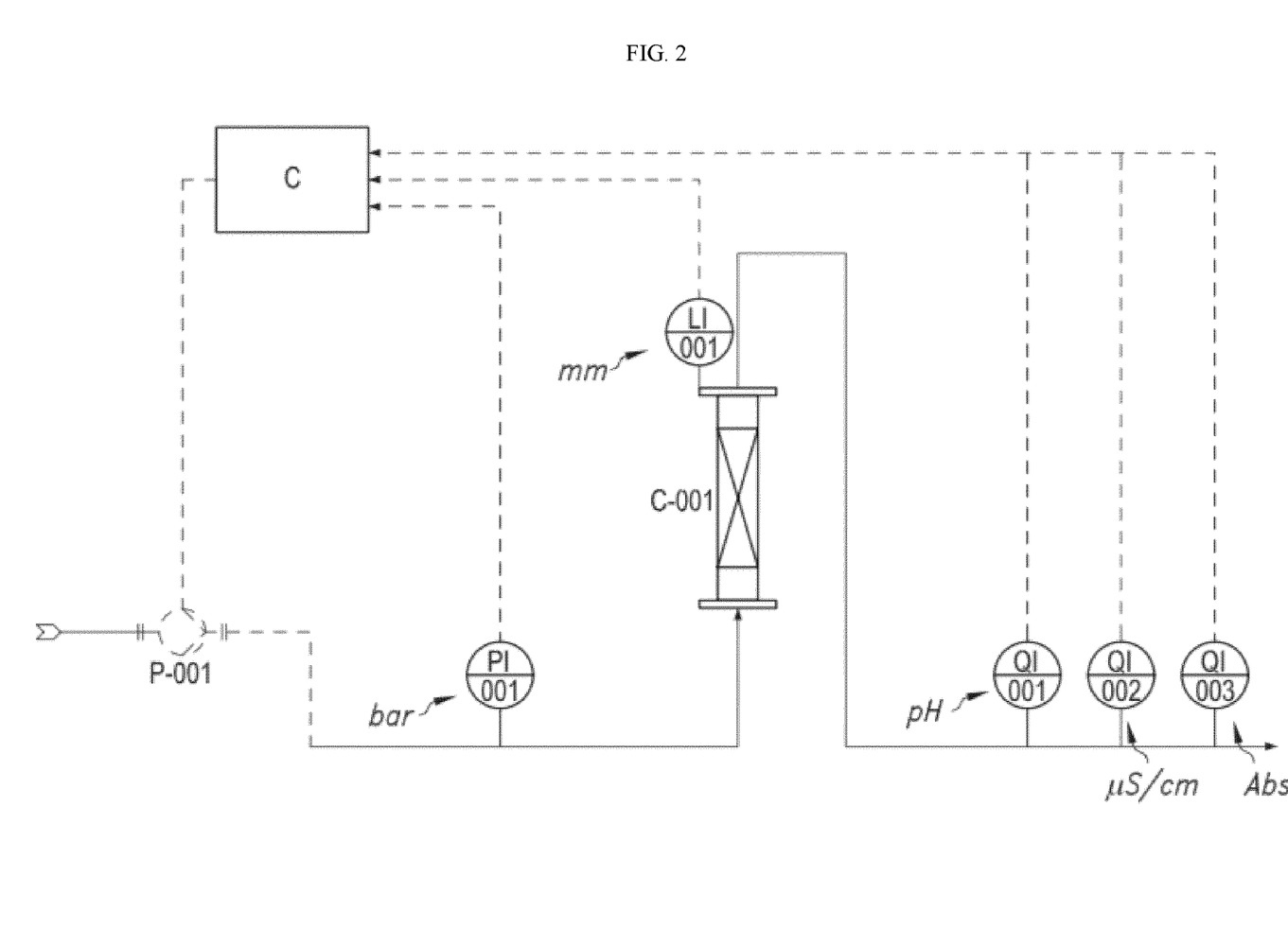
FIG. 2: Schematic representation EBA-SMB control, with different sensors including level sensor (LI-001), pH (QI-001), conductivity (QI-002) and UV sensors (QI-003) sending signals to controller C, which further sends the signal to the active column inlet pump (P-001).

In a particular embodiment of the invention the SMB device comprises a control system (C), such as a processor capable to process the output signal from the in-flow detectors and to regulate the inflow control units and outflow control units while enabling a predetermined level of the expanded bed of separation matrix in each of the separation units. The schematic representation of it is shown in FIG. 2, wherein the system is exemplified for a single column (C-001) which is part of a separation device according to the present invention.

In the context of the present invention, an "inflow control unit" is a unit, which is connected to the upstream end of a separation unit, i.e. where the liquid stream enters the separation unit. The inflow control unit may be a single piece of equipment combining the functions of both the pump and the valve. Alternatively, the inflow control unit may be a functional unit of a pump and a valve, each arranged as a separate piece of equipment. The inflow control unit may either be located at the upstream end of the separation unit or it may be located at a more remote place within the separation device.

In the context of the present invention, an "outflow control unit" is a valve, which is connected to the downstream end of a separation unit, i.e. where the liquid stream leaves the separation unit. The outflow control unit may either be located at the downstream end of the separation unit or it may be located at a more remote place within the separation device.

The terms "upstream" and "downstream" relate to an arrangement of items or features relative to the direction of flow in the separation device, wherein relative to a first position of a flow generating means (such as a pump), a second position in the flow of liquid closer to the flow generating means is "upstream", and a third position in the flow of liquid further away from the flow generating means is "downstream".

The separation device comprises in embodiments a plurality of separation units with inlet and outlet control units. The inlet and outlet control units are configured to establish a liquid flow through each separation unit and in particular through the one or more columns in each separation unit in an upward direction, resulting for each separation unit into an inlet stream and an outlet stream.

The separation units and in particular the one or more columns in each separation unit each are arranged in a substantially vertical position. This means that the longitudinal, vertical and lateral axes of the columns does deviate from the perfect vertical position by not more than 10 degrees, preferably by not more than 9 degrees, preferably by not more than 8 degrees, preferably by not more than 7 degrees, preferably by not more than 6 degrees, preferably by not more than 5 degrees, preferably by not more than 4 degrees, preferably by not more than 3 degrees, preferably by not more than 2 degrees, preferably by not more than 1 degree, preferably by not more than 0.5 degree, preferably by not more than 0.2 degree, preferably by not more than 0.1 degree, preferably by not more than 0.05 degree.

With a flow in an upward direction is meant here a flow from the bottom of the column to the top of the column.

In the illustrative Example 1 and in FIG. 1, the invention is described in an embodiment with in total 8 columns. However, the invention relates to a device with any number of columns, more than two. For practical purposes the device preferably contains not more than 50 columns, preferably not more than 40 columns, more preferably not more than 30 columns, more preferably not more than 20 columns, more preferably not more than 10 columns.

The term "plurality" refers to two or more. With respect to the cited "plurality of separation units" the minimum number of separation units is two. For practical purposes the device preferably contains not more than 20 separation units, preferably not more than 15 separation units, more preferably not more than 100 separation units, more preferably not more than 8 separation units, more preferably not more than 6 separation units.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system such as a processor that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The system, or apparatus, or device may execute an action in a "mode" or "operation mode" or "mode of operation". Likewise, in a method an action or stage, or step may be executed in a "mode" or "operation mode" or "mode of operation". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

The simulated moving bed separation device may comprise or may be functionally coupled to a control system.

The control system may be configured to control the plurality of separation units. Especially, the control system may be configured to control the inlet and outlet control units. Hence, the control system may be configured to control the inlet stream(s) and outlet stream(s). Hence, the control system may be configured to control the upward flow through the plurality of separation units during a plurality of steps. Yet further, in embodiments the control system may be configured to control the at least one pump and the at least one valve of each inflow control unit. Especially, the control system is configured to control the feeding of the liquid to the inlet of each separation unit in sequence (as during operation the liquid is fed to the inlet of each separation unit in sequence). The control system is configured to control start of a step (wherein each of the separation units can subsequently be subjected), and maintain the desired conditions in the separation unit (such as matrix bed level and flow rate), and the end of the step. Yet further, the control system is especially configured to control one or more of a washing step, an elution step, a cleaning step, an equilibration step or a compensation step (wherein each of the separation units can subsequently be subjected). Further, the control system may be configured to control each outflow control unit. In specific embodiments, the control system is configured to control the at least one valve of each of the outflow control units.

The control system may control in dependence of one or more of a chemical or physical parameter. Hence, the control system may control in dependence of a parameter. The term "parameter" may also refer to a plurality of different parameters. In embodiments, the control system is configured to control in dependence of a predefined threshold of the parameter. In yet other embodiments, the control system may be configured to control in dependence of time. In yet further embodiments, the control system may be configured to control in dependence of a type of liquid feed mixture. In yet further embodiments, the control system may be configured to control in dependence of a flux of liquid feed mixture to the device.

BRIEF DESCRIPTION OF THE FIGURES

| Number | Meaning |
|---|---|
| 2 | Output port 1 |
| 3 | Output port 2 |
| 4 | Output port 3 |
| 5 | Output port 4 |
| 6 | Output port 5 |
| 7 | Input port 1 |
| 8 | Input port 2 |
| 9 | Input port 3 |
| 10 | Input port 4 |
| 11 | Input port 5 |
| 12 | pH |
| 13 | µS/cm |
| 15 | QI/001 |
| 16 | QI/002 |
| 17 | QI/003 |
| 19 | V1-001 |
| 20 | V2-001 |
| 21 | V3-001 |
| 22 | V4-001 |
| 23 | V5-001 |
| 24 | V6-001 |
| 25 | V7-001 |
| 26 | V8-001 |
| 27 | V1-002 |
| 28 | V2-002 |
| 29 | V3-002 |
| 30 | V4-002 |
| 31 | V5-002 |
| 32 | V6-002 |
| 33 | V7-002 |
| 34 | V8-002 |
| 35 | V1-003 |
| 36 | V2-003 |
| 37 | V3-003 |
| 38 | V4-003 |
| 39 | V5-003 |
| 40 | V6-003 |
| 41 | V7-003 |
| 42 | V8-003 |
| 43 | V1-004 |
| 44 | V2-004 |
| 45 | V3-004 |
| 46 | V4-004 |
| 47 | V5-004 |
| 48 | V6-004 |
| 49 | V7-004 |
| 50 | V8-004 |
| 51 | V1-005 |
| 52 | V2-005 |
| 53 | V3-005 |
| 54 | V4-005 |
| 55 | V5-005 |
| 56 | V6-005 |
| 57 | V7-005 |
| 58 | V8-005 |
| 59 | V1-006 |
| 60 | V2-006 |
| 61 | V3-006 |
| 62 | V4-006 |
| 63 | V5-006 |
| 64 | V6-006 |
| 65 | V7-006 |
| 66 | V8-006 |
| 67 | V1-007 |
| 68 | V2-007 |
| 69 | V3-007 |
| 70 | V4-007 |
| 71 | V5-007 |
| 72 | V6-007 |
| 73 | V7-007 |
| 74 | V8-007 |
| 75 | V1-008 |
| 76 | V2-008 |
| 77 | V3-008 |
| 78 | V4-008 |
| 79 | V5-008 |
| 80 | V6-008 |
| 81 | V7-008 |
| 82 | V8-008 |
| 83 | V1-009 |
| 84 | V2-009 |
| 85 | V3-009 |
| 86 | V4-009 |
| 87 | V5-009 |
| 88 | V6-009 |
| 89 | V7-009 |
| 90 | V8-009 |
| 91 | V1-010 |
| 92 | V2-010 |
| 93 | V3-010 |
| 94 | V4-010 |
| 95 | V5-010 |
| 96 | V6-010 |
| 97 | V7-010 |
| 98 | V8-010 |
| 99 | V1-011 |
| 100 | V2-011 |
| 101 | V3-011 |
| 102 | V4-011 |
| 103 | V5-011 |
| 104 | V6-011 |
| 105 | V7-011 |
| 106 | V8-011 |
| 108 | LI-001 |
| 109 | LI-002 |
| 110 | LI-003 |
| 111 | LI-004 |
| 112 | LI-005 |
| 113 | LI-006 |
| 114 | LI-007 |
| 115 | LI-008 |
| 116 | C-001 |
| 117 | C-002 |
| 118 | C-003 |
| 119 | C-004 |
| 120 | C-005 |
| 121 | C-006 |
| 122 | C-007 |
| 123 | C-008 |
| 124 | Abs |
| 125 | Pump 1 |
| 126 | Pump 2 |
| 127 | Pump 3 |
| 128 | Pump 4 |
| 129 | Pump 5 |

Items No 116-123 represent eight columns (C-001-C008).

Items No 108-115 (LI/001-LI/008) represent level sensors which each monitor the level (expressed in mm) of the separation matrix in the respective columns.

Items No 19-106 all represent solenoid valves with internal diameter of 2 mm.

The separation device comprises eight columns (numbered 116 through 123) with inlet and outlet through which a liquid flow of the mixture can be established in each column in an upward direction.

Each of the columns comprises an expanded bed of a separation matrix.

Each of columns is communicatively coupled to an inflow control unit and to an outflow control unit.

Each inflow control unit comprises a pump (P) and a valve (one or more of items numbered 67 through 106).

Each outflow control unit consists of a valve (one or more of items numbered 19 through 58) without a pump.

The in-flow detectors included are item 15 for pH measurement, item 16 for measuring conductivity, and item 17 for measurement of UV light absorbance.

EXAMPLES

Example 1

EBA-SMB Setup

EBA-SMB technology as described in the claims consists of multiple EBA columns with every column connected to an input control unit consisting of at least one valve and one pump and output control unit consisting of at least one valve. The specifications of the EBA columns used for testing in EBA-SMB mode are described in Table 1.

TABLE 1

| expanded bed column dimension | |
|---|---|
| Total column height | 65 cm |
| Expanded bed height | Varied with flow rate |
| Column diameter | 2 cm |
| Settled bed height | 32 cm |
| Flow distribution mechanism | 3 cm ceramic bead bed |
| Expansion factor | Varied with flow rate |
| Bed level detection | Using ultrasound sensor mounted to fixed top adapter at the column outlet |

TABLE 2

| The EBA-SMB set-up as described in FIG. 1 includes | |
|---|---|
| Number of columns | 8 |
| Number of inlet valves/column | 5 |
| Number of outlet valves/column | 5 |
| Number of series valves/column | 1 |
| Number of inlet pumps for 8 columns | 5 (specific inlet valve of every column is connected to a common pump, for example inlet valve 1 of 5 of every column is connected to pump 1) |
| Number of input ports for pumps | 5 |
| Number of output ports for fractionation | 5 |
| EBA bed level measuring ultrasound sensors | 8 (1 attached to every column outlet) |
| Control unit (C) described in FIG. 2 | FIG. 2 describes that when a column is actively controlled, the controller receives signal from the sensors attached to the column or to the column inlet/outlet stream lines and sends signal to the inlet pump based on desired set-point. |

EBA-SMB Software

The EBA-SMB software for use according to the present invention runs a recipe, which is an adaptation of the time-based switching of column positions within a SMB cycle. As the EBA-SMB recipe might require executing bed level control depending on the column position, it is important to note that the constant time per position will result in variable bed volumes of the input stream per position. Therefore, constant volume is used as the set point for switching, in case of positions with active bed level control. However, this further results in inconsistent switch times for such positions, which can lead to accumulation or unavailability of columns in certain positions. To avoid this, an approach has been derived with compensation positions, which account for the inconsistent switch times in case of positions with active bed level control. These compensation positions can also be utilized for optimization of EBA-SMB, depending on the process flexibility.

TABLE 3

| Gel type matrix properties | |
|---|---|
| Composition | 50-55% sulphonated polymer of styrene, divinylbenzene and ethylstyrene Na$^+$ form 45-50% water |
| Porosity | gel type |
| Density/specific gravity | 1150-1200 g/l |
| Operating pH | 0-14 |
| Maximum operating temperature | 120° C. |
| Particle diameter | 300 μm |
| Particle size distribution | ≥95% |
| Ion-exchange capacity | 1.7-1.8 eq/l |

TABLE 4

| Feed composition | |
|---|---|
| Liquid feed mixture | fermentation broth containing GABA |
| GABA concentration | 70-110 g/l |
| Biomass dry weight concentration | 1-16 g/l |
| Sugars | 0.1-2 g/l |
| Organic acids | 0.5-5 g/l |
| Glycerol | 0.1-1.4 g/l |
| Density | 1010-1100 g/l |
| Viscosity | 1.1-1.3 mPa·s |
| pH | 4-6.5 |

Test Conditions:

The results were obtained by testing various process conditions using the EBA-SMB set-up which involved uniform and variable zone switching times during an SMB cycle. The matrix properties and feed composition are described in Table 3 and Table 4.

As described in the table below (Table 5), the experiments involved:

1. Change in the amount of feed fed/ml settled bed matrix volume (SBV)
2. Variation of the NaOH concentration in the elution buffer
3. Variation of the number of columns in feed and elution steps
4. Entrainment rejection (ER), where the liquid void in the column moving to a new step is replaced with the input liquid stream of that particular step
5. Extended elution to prevent non-ideal flow distribution of a single pump feeding more than 1 step
6. Fraction of the product-rich elution stream is to collect the elution peak sample using a specific output port

TABLE 5

Pump flow rate, input stream, inlet number, outlet number and switch time vs SMB step for experiments 002, 003 and 005

| Pump No. | Inlet No. | Step | Input stream | Flow rate (ml/min) | No. of SBV | Total number of columns | Number of columns in series | Output port No. |
|---|---|---|---|---|---|---|---|---|
| 1 | 1 | Regeneration | 4 wt % $H_2SO_4$ | 20 | 2 | 1 | NA | 5 |
| 2 | 2 | Elution | 5-8 wt % NaOH | 20 | 2 | 2 | 2 | 2 and 4 |
| 3 | 3 | Adsorption | Unclarified fermentation broth | 15 | 1 | 1 | NA | 5 |
| 4 | 4 | Equilibration | Demineralized water | 20 | 2 | 1 | NA | 5 |
| 4 | 4 | Elution wash | Demineralized water | 20 | 2 | 1 | NA | 3 and 4 |
| 5 | 5 | Adsorption wash | Demineralized water | 20 | 2 | 2 | 2 | 1 |

TABLE 6

Pump flowrate, input stream, inlet number, outlet number and switch time vs SMB step for exp 006 and 007

| Pump No. | Inlet No. | Step | Input stream | Flow rate (ml/min) | No. of SBV | Total number of columns | Number of columns in series | Output port No. |
|---|---|---|---|---|---|---|---|---|
| 1 | 1 | Regeneration | 4 wt % $H_2SO_4$ | 20 | 2 | 1 | NA | 5 |
| 2 | 2 | Elution | 8 wt % NaOH | 20 | 2 | 2 | 2 | 2 and 4 |
| 3 | 3 | Adsorption | Unclarified fermentation broth | 15 | 0.7 | 2 | 2 | 5 |
| 4 | 4 | Equilibration | Demineralized water | 20 | 2 | 1 | NA | 5 |
| 4 | 4 | Elution wash | Demineralized water | 20 | 2 | 1 | NA | 3 and 4 |
| 5 | 5 | Adsorption wash | Demineralized water | 20 | 2 | 1 | NA | 1 |

Figure 3:
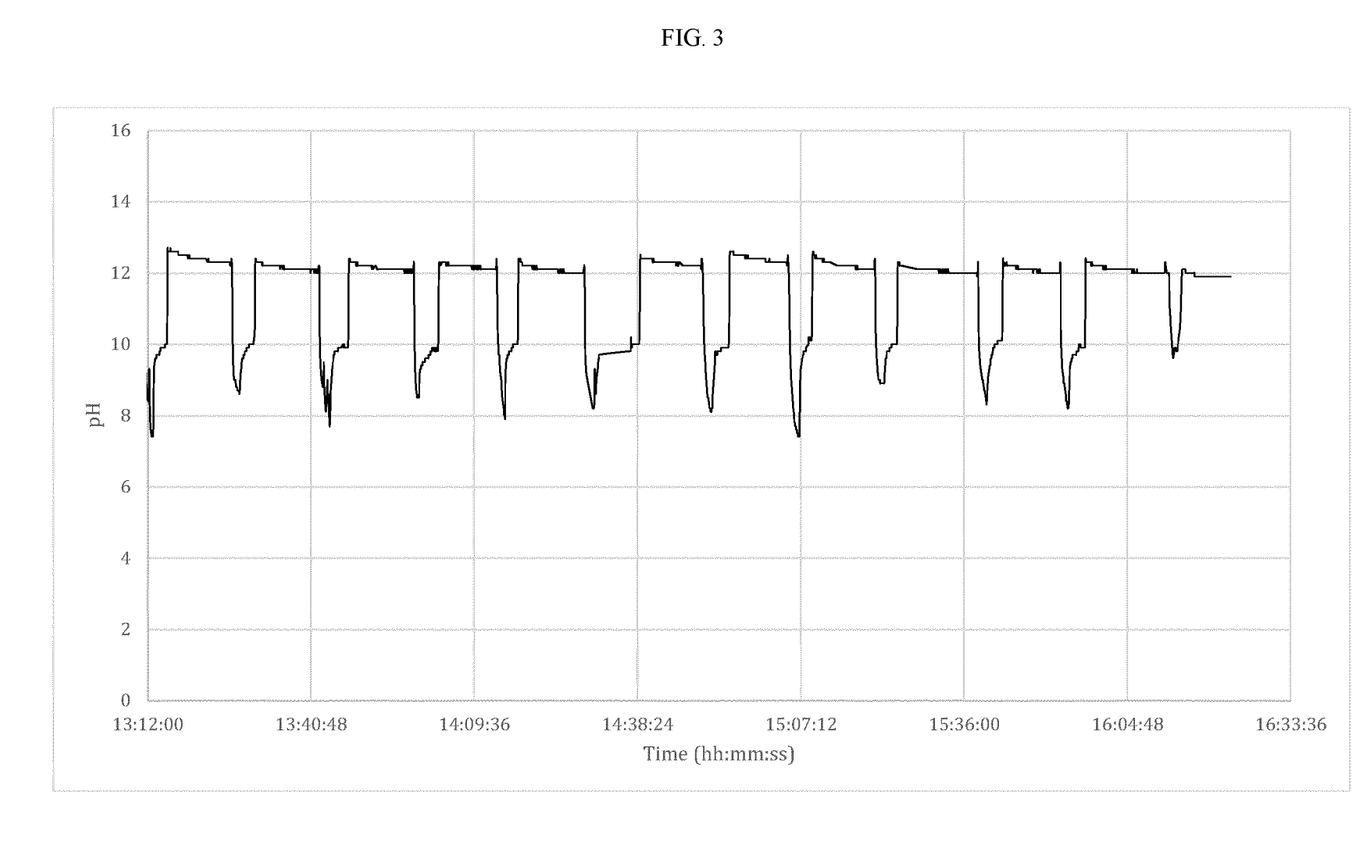
FIG. 3: Cycle time vs pH

Test Results:

The pH profile during the cycle time of several switches is described in FIG. 3. It is observed that the system exhibits a cyclic steady state performance under the conditions described in Table 4.

TABLE 7

Experimental results from the tests performed using the conditions described in table 5 and table 6

| Exp No. | Experimental description | Binding capacity (g GABA/L SBV) | Product titer (g GABA/L) | Bound GABA recovery in elution (%) | Yield in feed zone (%) | Overall GABA Yield (%) |
|---|---|---|---|---|---|---|
| 002 | 1 column feed without ER, 2 column 5 wt % NaOH elution with selective product collection | 65.4 | 33 | 55.02 | 53 | 29.29 |
| 003 | 1 column feed without ER, 2 column 8 wt % NaOH elution with selective product collection | 63 | 47 | 78.46 | 50 | 39.56 |
| 005 | 1 column feed without ER, 2 column 8 wt % NaOH elution modified fractionation compared to 003 | 82 | 47 | 84.45 | 51 | 43 |

TABLE 7-continued

Experimental results from the tests performed using the conditions described in table 5 and table 6

| Exp No. | Experimental description | Binding capacity (g GABA/L SBV) | Product titer (g GABA/L) | Bound GABA recovery in elution (%) | Yield in feed zone (%) | Overall GABA Yield (%) |
|---|---|---|---|---|---|---|
| 006 | 2 column feed with ER, increased SBH, 2 column 8 wt % NaOH elution with fractionation | 50 | 50 | 60 | 74 | 45 |
| 007 | 2 column feed with ER, increased SBH, 2 column 8 wt % NaOH extended elution with fractionation | 50 | 50 | 84 | 74 | 64 |

Conclusions:

From the results described in Table 7, the following conclusions are derived,

1. Decreasing the amount of feed/column and increasing the number of feed zone columns from 1 to 2 along with ER, resulted in a feed zone GABA recovery increase from about 50% (EXP002, 003, 005) to about 74% (EXP006, 007), but at a lower binding capacity of 50 g/L SBV. However, considering the 8-column configuration and critical adsorption wash and elution zones, the maximum number of columns that can be accommodated for the feed zone is only 2. Therefore, to achieve a further increase in yield at higher binding capacities and to capture the break through GABA, it is required to configure more than 2 columns in the feed zone.
2. On increasing the NaOH concentration from 5 to 8 wt % in the elution buffer, the GABA recovery in feed zone increased from about 55% (EXP002) to about 84% (EXP005). This change also resulted in a product titer increase from 33 g/L to 47 g/L.
3. In addition to the above factors, it was observed that the part of the elution product fraction was collected during ER in elution wash zone (EXP006). During this recipe, the elution wash zone employed the same pump as the regeneration wash. As there has been no flow distribution mechanism to ensure an equal flow to the two different zones, a non-ideal flow of the elution product stream resulted during the course of the SMB cycle, which reduced elution recovery to 60%.". This was avoided by performing a run with extended elution (EXP007), where the elution zone duration was increased to collect the complete product fraction before the column proceeds to the elution wash zone. This approach resulted in an elution recovery of 84% with a product titer of 50 g/L when the binding capacity was 50 g/SBV.

The overall conclusion of these EBA-SMB experimental studies is that the system can be further optimized to improve GABA recovery in the feed zone and to enhance the overall yield. As a result, the product titer can be enhanced due to higher binding capacity when more columns are available in feed zone, without compromising on yield. Individual inlet pump/column can avoid the need for an extended elution zone. The EBA-SMB technology itself performed consistently during the optimization studies with defined bed level control mechanism. Based on the impurity analysis, the EBA-SMB process achieved a purity of >92% GABA from unclarified fermentation broth, comparable to >93% GABA purity in case of purification of GABA from clarified broth using packed bed adsorption. From the results so far, under the most optimal conditions, the productivity has been improved by 2-fold compared to SMB packed bed. Thus, building the case to eliminate clarification steps and increase the productivity.

The invention claimed is:

1. A method for the separation of at least one component from a liquid feed mixture in a simulated moving bed separation device,
    wherein the separation device comprises a plurality of separation units each with a fixed inlet and a fixed outlet through which during operation of the simulated moving bed separation device a liquid flow can be established in each separation unit in an upward direction, resulting for each separation unit into an input stream and an output stream;
    wherein each of the plurality of separation units comprises an expanded bed of a separation matrix;
    wherein in each of the separation units the space above the separation matrix bed is completely filled with liquid without a gas void above the separation matrix bed;
    wherein each of said plurality of separation units is communicatively coupled to at least one inflow control unit and to at least one outflow control unit;
    wherein each inflow control unit comprises at least one pump and at least one valve;
    wherein each outflow control unit comprises at least one valve;
    wherein each outflow control unit does not comprise a pump;
    wherein the liquid feed mixture is fed to the inlet of each separation unit in sequence;
    wherein each of the separation units is subsequently subjected to one of a washing step, an elution step, a cleaning step, an equilibration step or a compensation step; and
    wherein a purified product outlet stream containing the at least one component is collected.

2. A method according to claim 1, wherein each separation unit comprises one or more columns.

3. A method according to claim 2, wherein a separation unit comprises two or more columns, which are operated in series.

4. A method according to claim 2, wherein a separation unit comprises two or more columns, which are operated in parallel.

5. A method according to claim 1, wherein the device comprises a plurality of in-flow detectors which can provide an output signal corresponding to the detection of a chemical or physical parameter.

6. A method according to claim 5, wherein the device further comprises a processor capable to process the output signal from the in-flow detectors and to regulate the inflow and outflow control units while maintaining a predetermined level of the expanded bed of the separation matrix in each of the separation units.

7. A method according to claim 1, wherein the liquid feed mixture is a biological broth.

8. A method according to claim 1, wherein the fixed outlet of each separation unit is provided with a fixed top adapter.

* * * * *